United States Patent [19]

Starks

[11] 4,200,706

[45] Apr. 29, 1980

[54] CURING OF PHENOL-FORMALDEHYDE RESINS

[75] Inventor: Charles M. Starks, Ponca City, Okla.

[73] Assignee: Conoco, Inc., Ponca City, Okla.

[21] Appl. No.: 910,820

[22] Filed: May 30, 1978

[51] Int. Cl.² .................................................. C08L 61/10
[52] U.S. Cl. .................................. 525/502; 525/505; 525/506; 525/508
[58] Field of Search ................................. 260/844, 848

[56] References Cited

U.S. PATENT DOCUMENTS

| 2,809,181 | 10/1957 | Turner et al. | 260/848 |
| 3,083,118 | 3/1963 | Bridgeford | 260/844 |

Primary Examiner—Wilbert J. Briggs, Sr.
Attorney, Agent, or Firm—Cortlan R. Schupbach, Jr.

[57] ABSTRACT

Phenol-formaldehyde resoles and novalacs are cured at temperatures of from about 0° C. to about 150° C. and at pressures ranging from about atmospheric pressure to about 5 atmospheres to produce highly cross-linked resins when divinylbenzene is used as a cross-linking agent together with a minor amount of an acidic catalyst.

4 Claims, No Drawings

CURING OF PHENOL-FORMALDEHYDE RESINS

This invention relates to a method for forming highly cross-linked phenol-formaldehyde resins at moderate temperatures and ambient pressures. More specifically, this invention relates to a method for producing highly cross-linked phenol-formaldehyde resins at temperatures of from 0° to 150° C. and about ambient pressures through the use of divinylbenzene as a cross-linking agent together with a small amount of an acidic catalyst.

Phenol-formaldehyde resins are normally formed as novalacs or resoles (resoles are A-stage resins, the first stage of condensation of phenol-formaldehyde resins, fuseable and completely soluble in alcohol). The resoles and novalacs are normally highly cross-linked by heating to high temperatures while under high pressures. The high temperature is necessary to obtain commercially acceptable fast curing rates and the high pressure is necessary to prevent water or ammonia from escaping from the curing resins so fast that it forms pockets or voids in the resin, which voids greatly reduce the strength of the resin. Novalacs are thermoplastic, soluble, phenol-formaldehyde resins obtained by the use of acid catalysts and excess phenol. These materials are normally cured to the thermosetting insoluble form with hexamethylenetetramine, although other curing agents are known. Thus the finished phenol-formaldehyde resin is caused by the addition of more formaldehyde or hexamethylene tetramine to the basic resole or novalac resin precursor. This procedure is explained in greater detail in the *Chemistry of Phenolic Resins*, R. W. Martin, Chapter 5, Wiley and Sons, New York, 1956. Curing agents such as water or ammonia cause vapors to be evolved during curing.

Generally, thermosetting references undergo further polymerization and crosslinking when a molding compound is molded, a liquid resin is cast or an adhesive is set. The resins are formed into the desired shape and cured to an insoluble, infusible solid by an irreversible chemical cross-linking reaction. Normally, the phenol-formaldehyde novalacs and resoles require the addition of a cross-linking agent. Hexamethylenetetramine is the most commonly used cross-linking agent. For all novalacs and resoles the rate of cure can be increased and the final properties altered by the addition of a curing agent or catalyst. In some cases, the catalyst merely changes the pH to increase the rate of cure and in other cases the curing agent is a polyfunctional molecule which reacts with the polymer chains to cross-link.

Depending upon the end use of the resin, the curing characteristics of the resin is the most single important property. The catalyst can be selected to permit rapid cures at only moderately elevated temperature, generally at the cost of the time of curing. Thus, catalysts are available which will permit curing at room temperatures; however, lengthy periods of time are normally required. For example, the selection of a catalyst depends upon the procedure to be used. If the catalyst is to be added immediately prior to use, a very active catalyst can be used, thus curing would be very rapid but the shelf life of the resin mixture is very short.

When the resin is to be cured, the hardening effect should not take place until the resin has been heated to the plastic point such that the compound can flow easily to fill a mold or to produce a uniform surface. At processing temperatures, the accelerating affect should commence quickly, and the speed of the reaction must be as fast as possible.

In general, curing of phenol-formaldehyde resoles and novalacs takes place as the polymer chains increase in molecular weight and are cross-linked. The theoretical maximum for these resins is a single molecule, entirely cross-linked. However, in actual practice, normally a 30–40% cross-linking is considered to be a practical maximum, and even a 10% cross-linking is considered to be highly cross-linked. Thus, in general, from 10 to 40% cross-linking would be considered a highly cross-linked resin.

Phenol-formaldehyde novalacs and resoles in general do not contain sufficient formaldehyde to form methylene bridges. Thus, in practice, formaldehyde is added to novalacs in an alkaline solution to cure the resin. More commonly, solid hexamethylenetetramine is mixed with a novalac to produce a syrup which will cure upon heating. Such novalacs, when heated at temperatures up to 130° or 140° C. (266° to 284° C.) form bis- and tri-hydroxybenzyl amines. The bis- and tris-hydroxybenzyl amines reacting with an excess of phenol, eliminate nitrogen to produce methylene bridges. At temperatures of from 160°–170° C. ammonia release is common and at higher temperatures amine linkages undergo further reactions leading to decomposition which produces xanthene and methyl phenols along with further ammonia and methylamine. It is these resins which are normally cured at high temperatures for speed of reaction and under high pressures to supress the formation of bubbles or pockets in the resin formed by the release of ammonia or water.

Since the time that a resin is exposed to a given temperature determines the extent of cure, it is apparent that all factors are inter-related in determining the optimum cure time and temperature. Uneven temperatures can produce rapid curing with uneven stresses.

It would therefore be of great benefit to provide a curing process which would lead to curing at low temperatures and pressures with reasonable cure time to provide highly cross-linked resins without voids or air pockets. Such a process would be highly beneficial and convenient in the preparation of phenol-formaldehyde resin products.

It is therefore an object of the present invention to provide a process whereby phenol-formaldehyde novalacs and resoles can be transformed into highly cross-linked phenol-formaldehyde resins at moderate temperatures and about ambient pressure in a reasonable length of time. Other objects will become apparent to those skilled in this art as the description proceeds.

It has now been discovered that divinylbenzene in conjunction with a small amount of an acid catalyst leads to good curing of phenol-formaldehyde novalacs and resoles. This curing can be carried out at low temperatures of from about 0° to about 150° C. at pressures from about atmospheric pressure to about 5 atmospheres in lengths of time ranging from 0.5 to 4 hours.

It will be apparent to those skilled in the art that the time necessary for curing will depend greatly upon the temperatures and the prior cross-linking heat history of the resin precursor used. The amount of divinylbenzene useful in the process of the instant invention ranges from about 0.05 to 1 divinylbenzene to novalac or resole up to about 1 to 1 divinylbenzene to novalac or resole, calculated by weight. Normal useage, however, will range from about 0.25 divinylbenzene to novalac or resole to about 0.50 divinylbenzene to novalac or resole, calculated by weight.

The temperatures at which the instant reaction can occur range from about 0° C. to about 150° C., although preferred temperature ranges are from about ambient (25° C.) to about 80° C. Under these temperature conditions and levels of divinylbenzene, normal curing time will range from about 0.5 to about 4 hours. It will be realized by one skilled in the art that as the amount of cross-linking agent is increased and the amount of heat is increased, the curing time will be greatly decreased. Longer curing times can, of course, be used if convenient, but are not necessary to achieve curing.

It is also necessary to utilize an acid catalyst in the system of the instant invention to initiate cross-linking. Normally, the acid catalyst will be used in a concentration of from about 0.0001 to about 0.1 part by part of novalac, preferably 0.01 to 0.05, said parts being based upon weight of the novalac or resole. The acid catalyst used is one which initiates cross-linking effectively. Simply using an acid catalyst will determine its usefulness in the instant invention. Generally speaking, acid catalysts useful in the instant invention include sulfuric acid, phosphoric acid, boron trifluore, trifluoroacetic acid, fluorophosphoric acid, formic acid, perchloric acid, dichloroacetic acid, hydrofluoric acid, hydrobromic acid, hydrochloric acid, methane sulfonic acid, butane sulfonic acid, benzoic acid, toluene sulfonic acid, trichloroacetic acid, acetic acid, monochloroheptanoic acid, citric acid, and boric acid. It should be realized that this list is not exhaustive, but merely illustrative of the acid catalysts which can be used in the process of the instant invention.

In all experimental work carried out, technical grade divinylbenzene was used containing up to 45% ethylvinylbenzene. Thus it is apparent that other materials such as diethylbenzene can also be present without effecting the process of the instant invention, but all ratios described herein are based on actual divinylbenzene present.

Generally, in carrying out the process of the instant invention, the novalac or resole to be cured is mixed with divinylbenzene and allowed to stand for a sufficient time for the divinylbenzene to penetrate into the novalac or resole to soften the novalac or resole to a paste which can be easily shaped and molded. The soft, swollen novalac or resole, along with sufficient catalyst to make the resin acidic, is then placed into the desired shape and heated for a sufficient length of time to highly cross-link the resin. The resin thus formed is strong, but not brittle, as many resins of the prior art cross-linked with hexamethylenetetramine have proven to be. Generally, divinylbenzene mixtures containing up to 50% divinylbenzene will be efficient in the process of the instant invention, but divinylbenzene is the active cross-linking agent.

The instant invention is more concretely described with reference to the examples below wherein all parts and percentages are by weight unless otherwise specified. The examples are provided to illustrate the instant invention and not to limit it.

Example 1 shows the process of the instant invention when dealing with a phenol-formaldehyde novalac. Example 2 shows a process of the instant invention used with an o-cresol phenol-formaldehyde novalac and Example 3 shows a phenol-formaldehyde resole prepared according to a known process.

EXAMPLE 1

A mixture of 188 g of phenol, 81 g of 37% formaldehyde solution, and 3 g of zinc acetate dihydrate was heated with stirring to 95° C. for 3 hours. At the end of this time the apparatus was arranged for distillation and all volatile material was removed overhead to a reactor temperature of 210° C. and 88 mm mercury pressure. The remaining thick, hot, viscous novalac was poured into a glass bottle and allowed to cool to a brittle solid. The brittle solid was broken into small pieces and then further powdered for use.

Ten grams of the powdered novalac so produced was mixed with 15 g of a mixture of commercial divinylbenzene (45% ethylvinyl benzene and 55% divinylbenzene) and allowed to stand overnight. The novalac did not dissolve in the divinylbenzene. The novalac was observed to absorb sufficient divinylbenzene into the resin to cause the novalac to soften into a paste which was easily shaped and molded. The swollen novalac, along with sufficient methane sulfonic acid to make the resin acidic, (about 0.25 milliliter) was placed in a small mold and heated to 50° C. for 3 hours, during which time the novalac was cured to a highly cross-linked resin. The resin was extremely strong but did not appear brittle.

EXAMPLE 2

A mixture of 54 grams (g) of phenol, 25 g orthocresol, 32.1 g of 37% formaldehyde in water solution, and 1 g of zinc acetate dehydrate was heated to 90°-95° C. with stirring for 3 hours. At the end of this time the apparatus was arranged for distillation, and all volatile material was distilled overhead at 175° C. The remaining product in the reactor cooled to a very thick viscous liquid.

The novalac so prepared was soluble in commercial divinylbenzene, enabling combinations of the novalac with various portions of the acid catalyst to be made. Mixtures containing 75%, 50%, and 25% novalac with 25%, 50%, and 75% technical divinylbenzene were prepared. Addition of methane sulfonic acid (0.5 weight percent, based on the weight of the novalac) caused these mixtures to cure at room temperature to hard, highly cross-linked resins. Curing times ranged from about one hour to about four hours. Although only methane sulfonic acid catalyst was used, other acidic catalysts as herein before described could also be substituted.

EXAMPLE 3

A phenol-formaldehyde resole was prepared according to the procedure described for "casting resins" in the *Chemistry of Phenolic Resins,* R. W. Martin, Wiley and Sons, 1956, page 97. This resole, similar to that described in Example 1, was not soluble in technical divinylbenzene, but absorbed sufficient divinylbenzene such that rapid curing at 50° C. and atmospheric pressure was possible with the addition of 0.5 weight percent methane sulfonic acid, based on the weight of the resole.

Thus it can be seen that the process of the instant invention provides a simple and efficient method of producing highly cross-linked phenol-formaldehyde novalacs and resoles using ambient pressure and moderate temperatures. For the purposes of this specification and claims, low pressure is defined as pressures ranging up to about 5 atmospheric pressure. Of course, it will be realized that higher pressures can be used but that no benefit is gained therefrom in the process of the instant invention, since existing systems use high pressures and high temperatures. Such systems, however, require special equipment and careful monitoring to prevent voids in the finished product, all of which is eliminated by the process of the instant invention.

While certain embodiments and details have been shown for the purpose of illustrating this invention, it will be apparent to those skilled in this art that various changes and modifications may be made herein without departing from the spirit or the scope of the invention.

I claim:

1. A method for curing phenol-formaldehyde novalacs and resoles to highly cross-linked phenol-formaldehyde resins at temperatures of from about 25° C. to about 80° C. and pressures from about atmospheric pressure to about 5 atmospheres while using an acidic catalyst as curing agent, comprising using from about 0.05 to about 1 parts divinylbenzene per part of novalac by weight as a cross-linking agent.

2. A method as described in claim 1 wherein the acidic catalyst is selected from the group consisting of methane sulfonic acid, sulfuric acid, benzoic acid, toluene sulfonic acid, trichloroacetic acid, phosphoric acid, sulfuric acid, dichloroacetic acid fluorophosphoric acid, trifluoroacetic acid, hydrochloric acid, formic acid, hydrofluoric acid, hydrobromic acid, boric acid, and boron trifluoride.

3. A method as described in claim 2 wherein the acid catalyst is used in a concentration of from about 0.0001 to about 0.1 parts per weight based upon the weight of the novalac.

4. A method as described in claim 3 wherein the divinylbenzene is commercial divinylbenzene containing up to 50% by weight ethylvinylbenzene.

* * * * *